(12) United States Patent
Yu et al.

(10) Patent No.: US 11,703,000 B2
(45) Date of Patent: Jul. 18, 2023

(54) MULTI-FUEL SWITCHING DEVICE

(71) Applicant: CHONGQING ZONGSHEN GENERAL POWER MACHINE CO., LTD., Chongqing (CN)

(72) Inventors: Mingchun Yu, Chongqing (CN); Rui Wang, Chongqing (CN); Junjie Pei, Chongqing (CN)

(73) Assignee: CHONGQING ZONGSHEN GENERAL POWER MACHINE CO., LTD., Chongqing (CN)

( * ) Notice: Subject to any disclaimer, the term of this patent is extended or adjusted under 35 U.S.C. 154(b) by 0 days.

(21) Appl. No.: 17/750,393

(22) Filed: May 22, 2022

(65) Prior Publication Data

US 2023/0143603 A1    May 11, 2023

(30) Foreign Application Priority Data

Nov. 9, 2021    (CN) .......................... 202111316899.4

(51) Int. Cl.
| F02D 19/06 | (2006.01) |
| F02M 21/02 | (2006.01) |
| F02M 37/00 | (2006.01) |
| F16K 27/02 | (2006.01) |
| F16K 31/06 | (2006.01) |

(52) U.S. Cl.
CPC ..... *F02D 19/0676* (2013.01); *F02M 21/0236* (2013.01); *F02M 37/0064* (2013.01); *F16K 27/0263* (2013.01); *F16K 31/0603* (2013.01)

(58) Field of Classification Search
None
See application file for complete search history.

(56) References Cited

U.S. PATENT DOCUMENTS 9,803,773 B2 * 10/2017 Zhang ..................... F16K 31/06
2017/0159841 A1 * 6/2017 Zhang ................. F16K 11/0743

FOREIGN PATENT DOCUMENTS

| CA | 2928326 A1 * | 6/2017 | ......... F02D 19/0613 |
| CN | 104930220 A * | 9/2015 | ............... F16K 1/38 |
| CN | 105351104 A * | 2/2016 | ......... F02D 19/0613 |
| CN | 106285968 A * | 1/2017 | |
| CN | 105351104 B * | 8/2018 | ......... F02D 19/0613 |
| CN | 109268154 A * | 1/2019 | ......... F02D 19/0613 |
| CN | 106285968 B * | 3/2019 | |
| CN | 110017209 A * | 7/2019 | |
| CN | 113279862 A * | 8/2021 | |
| CN | 214741700 U * | 11/2021 | |

(Continued)

*Primary Examiner* — Kevin R Steckbauer
(74) *Attorney, Agent, or Firm* — JCIPRNET

(57) ABSTRACT

A multi-fuel switching device, including a gas part, is provided. The gas part includes a switching valve. The switching valve includes a housing having an air inlet and an air outlet. An internal rotation of the housing is provided with a valve core located between the air inlet and the air outlet. The valve core is provided with a first airway and a second airway. Cross-sectional sizes of the first airway and the second airway are different. The first airway or the second airway is selected through rotating the valve core to connect the air inlet and the air outlet. The solution solves the issue that a fuel switching device in the prior art cannot adapt to three or more fuels, which causes an internal combustion engine to be unable to maintain the optimal working state.

11 Claims, 7 Drawing Sheets

(56) References Cited

FOREIGN PATENT DOCUMENTS

| | | | | | |
|---|---|---|---|---|---|
| CN | 113864069 | A | * | 12/2021 | |
| FR | 3044736 | A1 | * | 6/2017 | ......... F02D 19/0613 |
| FR | 3044736 | B1 | * | 6/2020 | ......... F02D 19/0613 |

* cited by examiner

MULTI-FUEL SWITCHING DEVICE

CROSS-REFERENCE TO RELATED APPLICATION

This application claims the priority benefit of China application serial no. 202111316899.4, filed on Nov. 9, 2021. The entirety of the above-mentioned patent application is hereby incorporated by reference herein and made a part of this specification.

BACKGROUND

Technical Field

The disclosure relates to a fuel switching device, in particular to a multi-fuel switching device.

Description of Related Art

Existing internal combustion engines generally use a liquid fuel and a gas fuel when using multiple fuels. The switching between the liquid fuel and the gas fuel is generally implemented through a fuel switching device, and specifically through switching to turn off corresponding switches disposed on two fuel pipelines. When the internal combustion engine needs to use three or more fuels and contains two or more gas fuels, how to enable the internal combustion engine to implement the optimal working state is a technical issue to be solved.

SUMMARY

The disclosure provides a multi-fuel switching device to solve the issue that a fuel switching device in the prior art cannot adapt to three or more fuels, which causes an internal combustion engine to be unable to achieve the optimal working state.

In order to achieve the above objective, the basic solution of the disclosure provides a multi-fuel switching device, which includes a gas part. The gas part includes a switching valve. The switching valve includes a housing having an air inlet and an air outlet. A valve core is rotatably set within the housing and located between the air inlet and the air outlet. The valve core is provided with a first airway and a second airway. Cross-sectional sizes of the first airway and the second airway are different. The first airway or the second airway is selected through rotating the valve core to connect the air inlet and the air outlet.

The beneficial effect of the basic solution is that by adopting such setting, when switching between two gas fuels, the first airway or the second airway is correspondingly selected through rotating the valve core to connect the air inlet and the air outlet, so that the internal combustion engine can maintain the optimal working state when using different gas fuels. Moreover, the setting enables operators to maintain the optimal working state of the internal combustion engine by only performing a simple switching operation. At the same time, the setting has a simple structure, which is beneficial to reducing costs.

Further, the valve core is provided with an inlet opposite to the air inlet. The inlet extends along a direction of a rotating shaft of the valve core. The first airway and the second airway are both connected to the inlet. By adopting such setting, the structure of the valve core is conveniently simplified, thereby facilitating processing and manufacturing and reducing costs.

Further, a contour of a region of the valve core between an end of the first airway away from the inlet and an end of the second airway away from the inlet is greater than a contour of the air outlet. By adopting such setting, when the valve core is rotated such that the region of the valve core between the first airway and the second airway is opposite to the air outlet, the air outlet is covered and shielded, thereby implementing disconnection between the air inlet and the air outlet to implement simultaneous cutting off of two gas fuels, which is convenient for operation.

Further, the housing is rotatably connected to a rotating shaft. The rotating shaft is statically connected to the valve core. The rotating shaft is statically connected to a position feedback device. By adopting such setting, a position state to which the rotating shaft drives the valve core to rotate may be known in time through the position feedback device, thereby conveniently ensuring the accuracy of a rotating position of the valve core.

Further, the position feedback device includes a spinning part. The spinning part is provided with an elastic abutting part. The housing is statically connected to an alignment part cooperating with the elastic abutting part. By adopting such setting, the structure of the position feedback device is simple, which is beneficial to improving reliability.

Further, the alignment part has a groove shape. The elastic abutting part includes a steel ball slidably cooperating with the spinning part and a spring driving the steel ball.

Further, a liquid fuel switch is also included. The liquid fuel switch is rotatably linked with the valve core. By adopting such setting, a liquid fuel and the two gas fuels may be simultaneously switched through rotating the valve core, which is beneficial to simplifying the structure and improving the convenience of operation.

Further, the liquid fuel switch has a feeding nozzle and a discharging nozzle. The liquid fuel switch also includes a rotating part linked with a rotating shaft. The rotating part is located between the feeding nozzle and the discharging nozzle. The rotating part is provided with a fuel channel that implements connection between the feeding nozzle and the discharging nozzle through rotating the rotating part.

Further, a solenoid valve and a solenoid valve switch that control connection and disconnection of a main jet of a carburetor are also included. A protruding part linked with the rotating shaft and enabled to touch the solenoid valve switch is also included. By adopting such setting, connection and disconnection of fuel supply to the carburetor may be synchronously controlled through rotating the valve core, thereby facilitating operation.

Further, a flameout switch located at a side of the rotating shaft is also included. A flameout boss linked with the rotating shaft and used to trigger the flameout switch is also included. By adopting such setting, the objective of controlling flameout is conveniently achieved through rotating the rotating shaft, thereby facilitating operation.

Further, the housing is connected to an ignition angle control switch. A bump linked with the valve core and cooperating with the ignition angle control switch is also included. By adopting such setting, the ignition angle control switch is triggered by the bump when the valve core rotates, so that when different fuels are used, engine power loss caused by using different fuels is avoided through controlling the ignition time.

DETAILED DESCRIPTION OF DISCLOSED EMBODIMENTS

Figure 1:
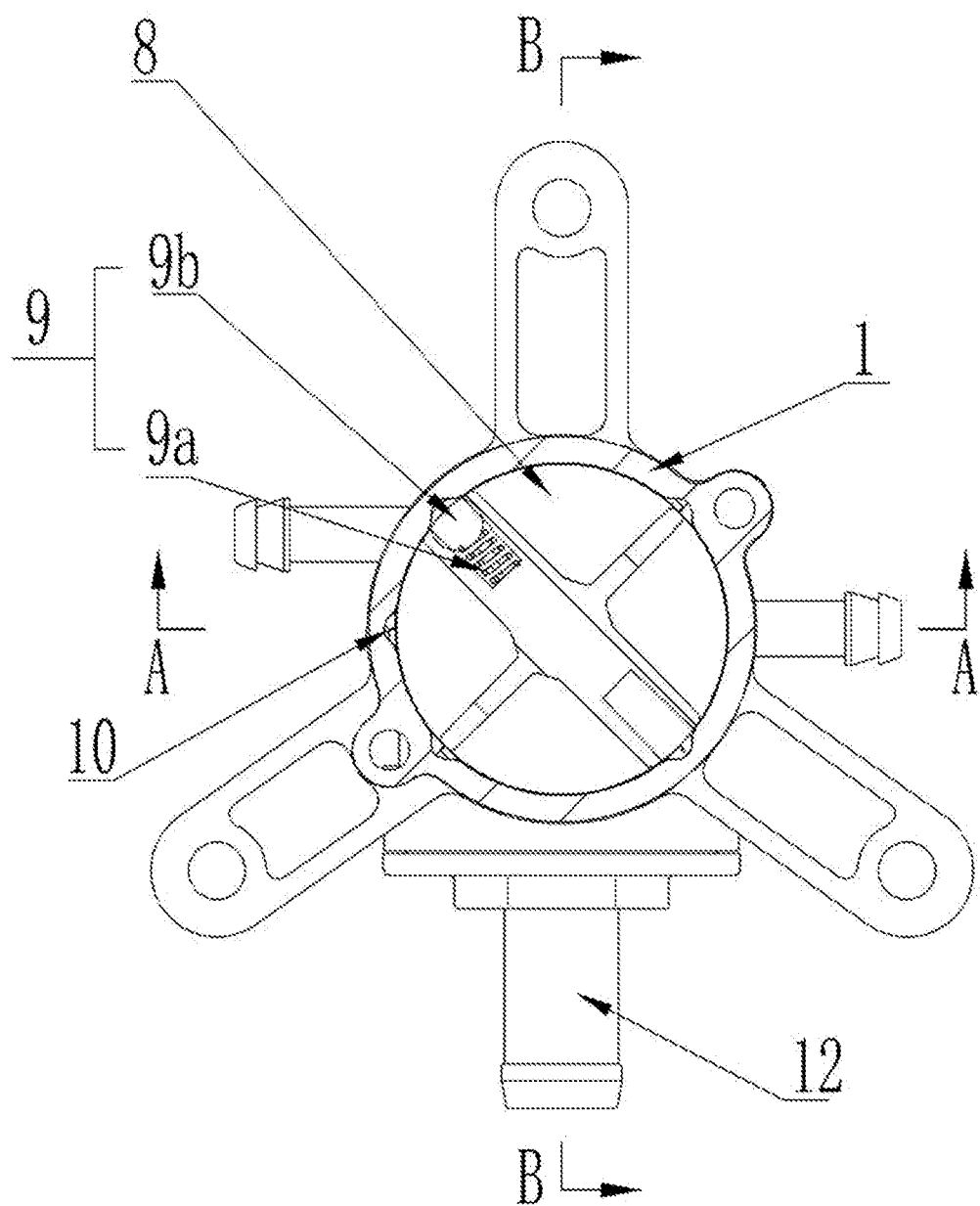
FIG. 1 is a schematic view of a multi-fuel switching device according to an embodiment of the disclosure.

The following is further described in detail through a specific embodiment.

Reference numerals in the drawings include housing 1, flameout switch 2, solenoid valve switch 3, valve core 4, rotating shaft 5, rotating part 8, spinning part 9, spring 9a, steel ball 9b, alignment part 10, air inlet 11, air outlet 12, feeding nozzle 15, fuel channel 16, discharging nozzle 17, first airway 41, second airway 42, inlet 43, protruding part 51, flameout boss 52, ignition angle control switch 53, first gas fuel position C, shut-down flameout position O, fuel-off flame-on position S, second gas fuel position N, and liquid fuel position F.

Figure 2:
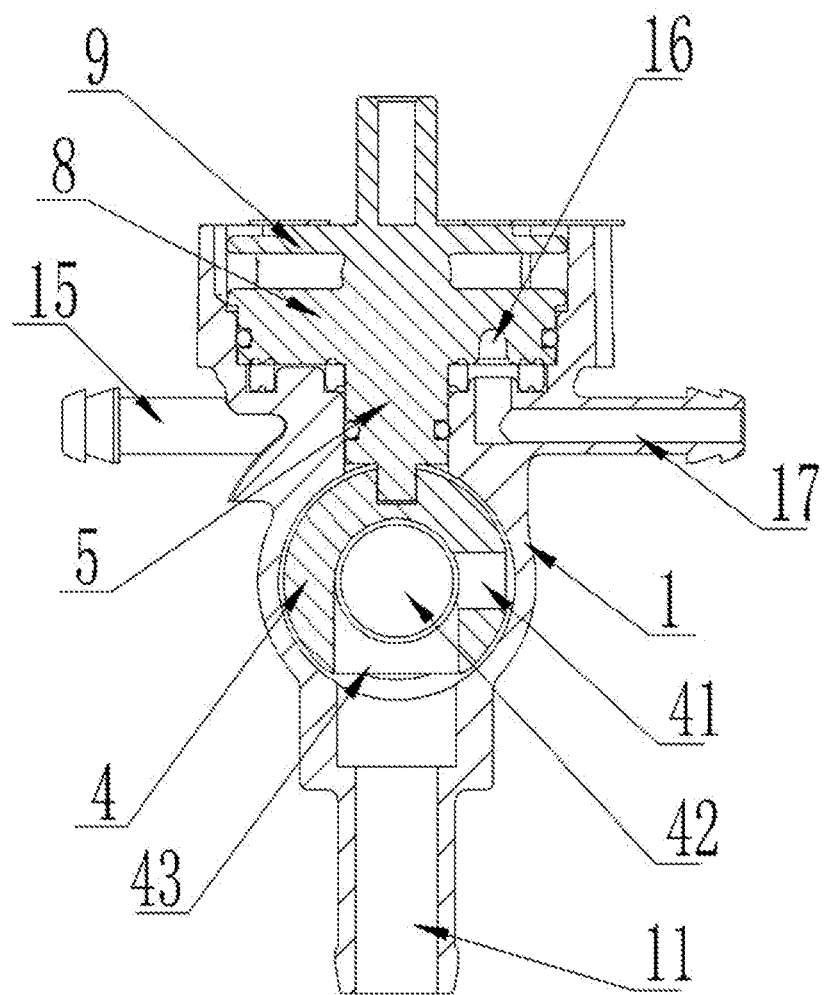
FIG. 2 is an A-A cross-sectional view in FIG. 1.
Figure 3:
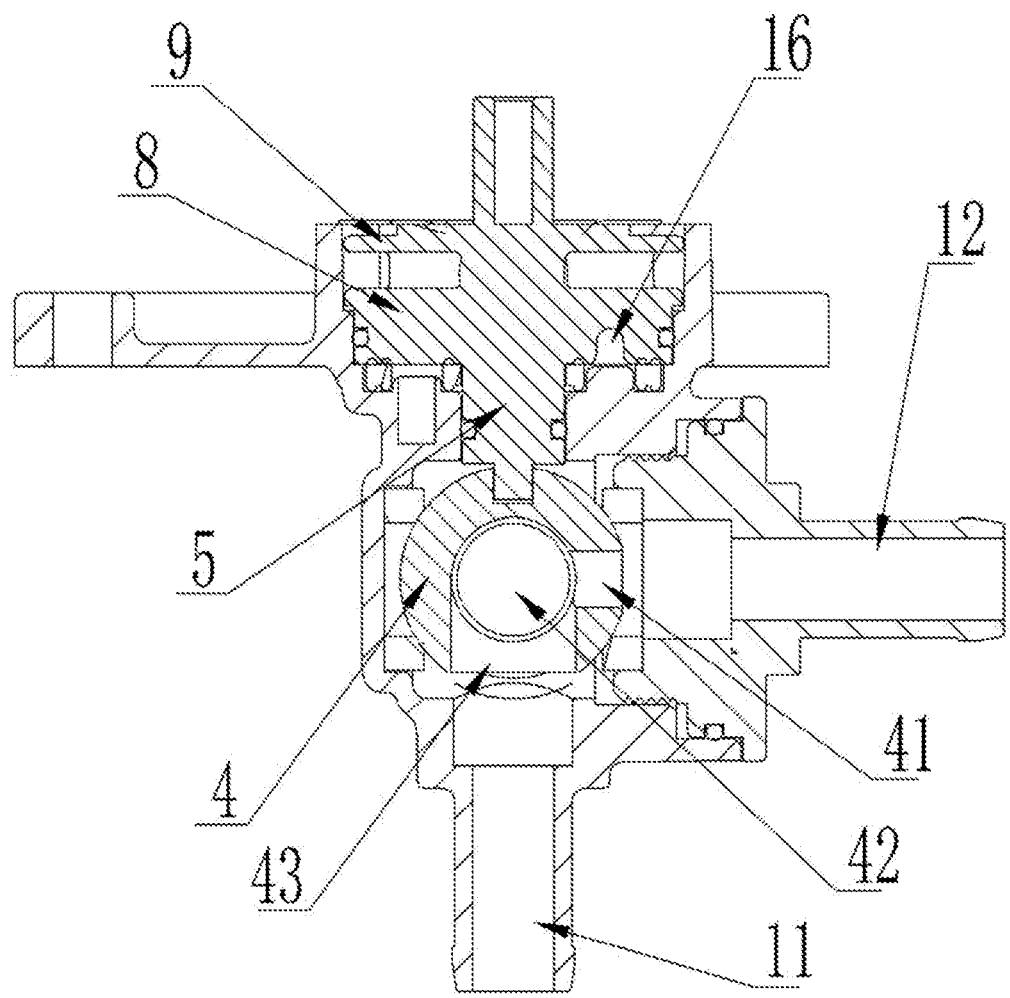
FIG. 3 is a B-B cross-sectional view in FIG. 1.
Figure 4:
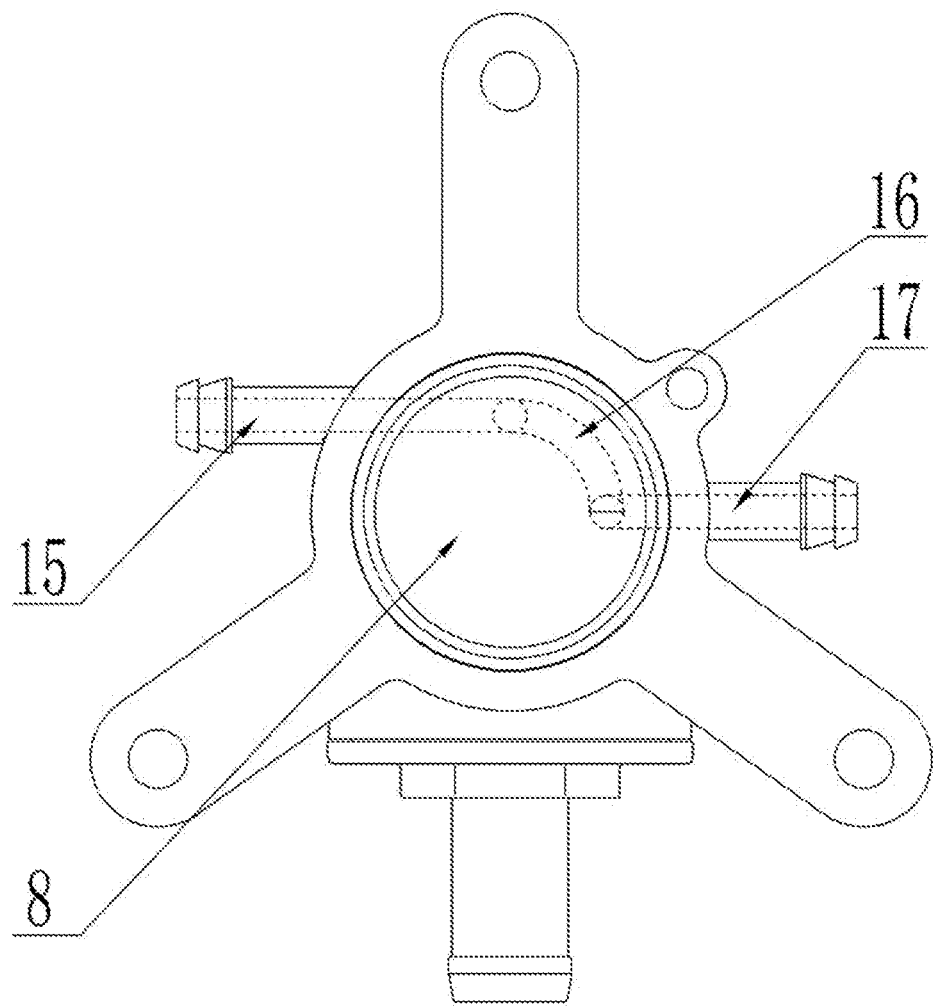
FIG. 4 is a top view of a state when a fuel channel of a rotating part in FIG. 2 is connected to a feeding nozzle and a discharging nozzle.
Figure 5:
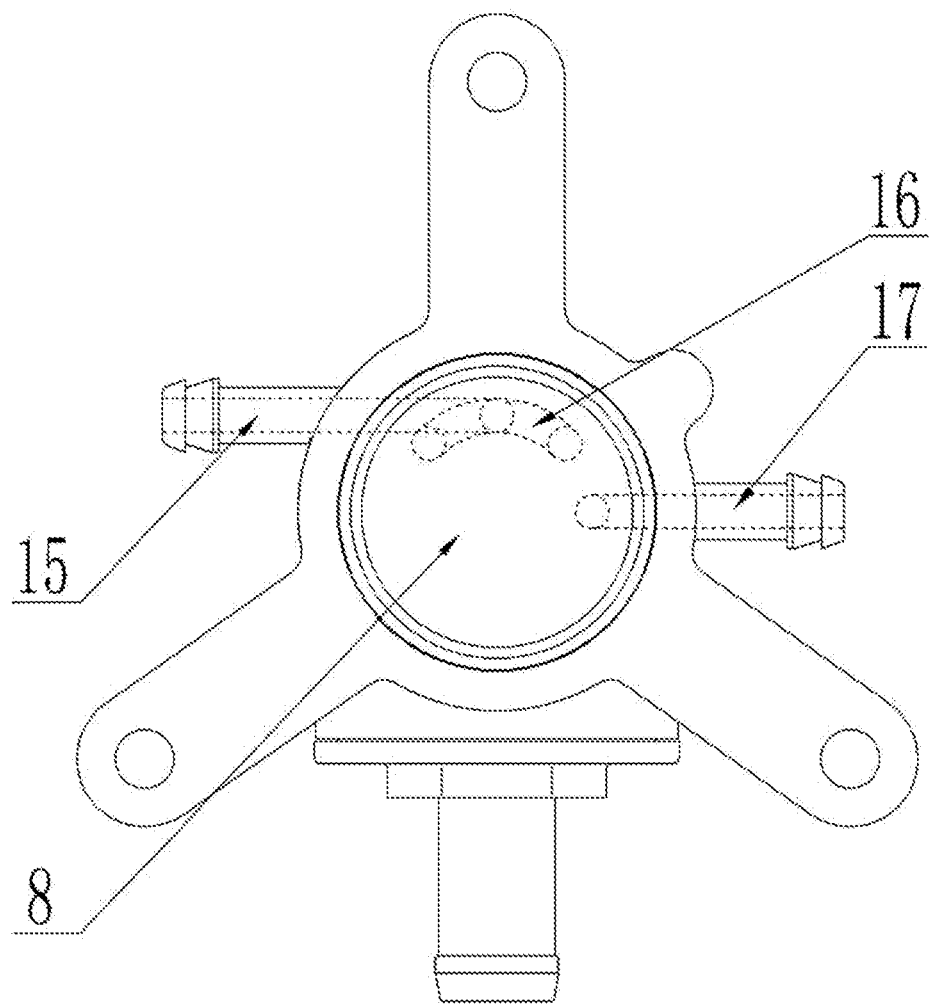
FIG. 5 is a schematic view of a state when the fuel channel of the rotating part in FIG. 4 is disconnected from the feeding nozzle and the discharging nozzle.
Figure 6:
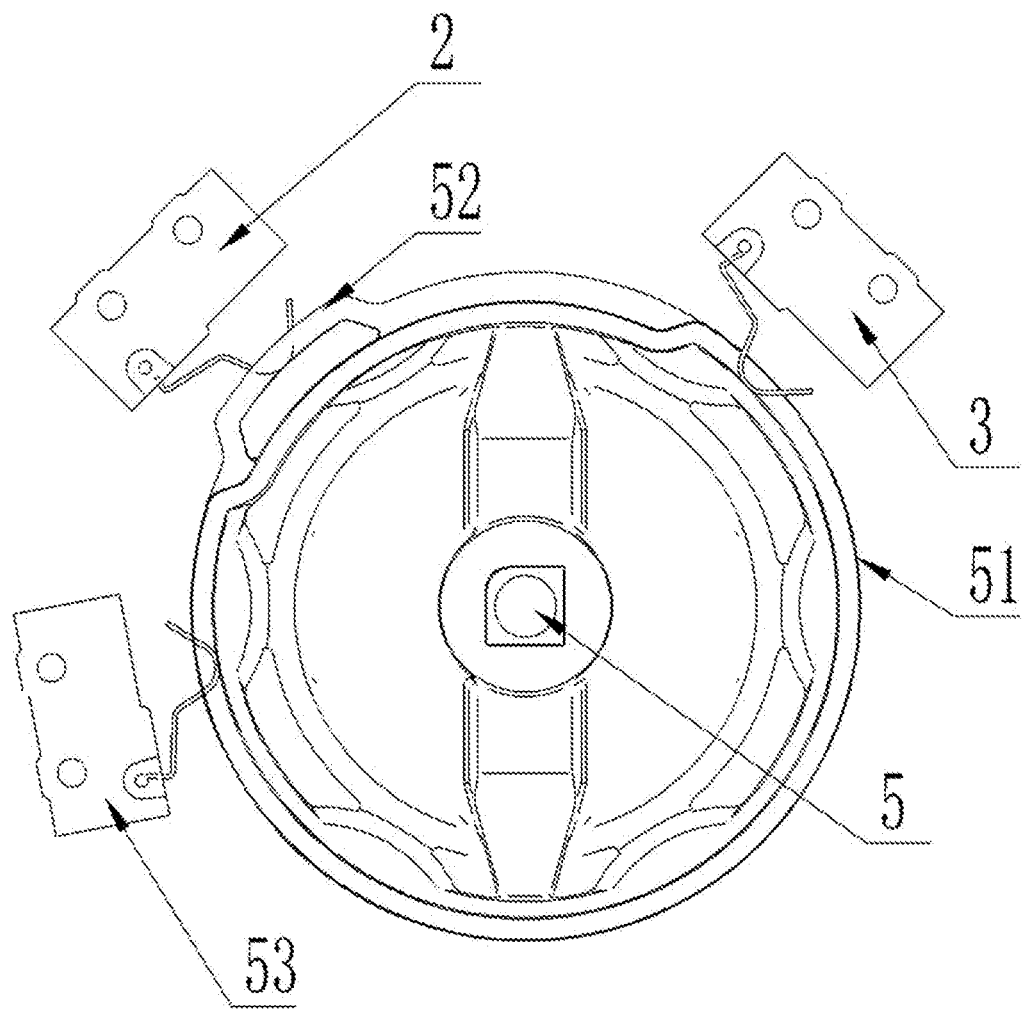
FIG. 6 is a schematic view of positions of a solenoid valve switch, a flameout switch, and a rotating shaft.
Figure 7:
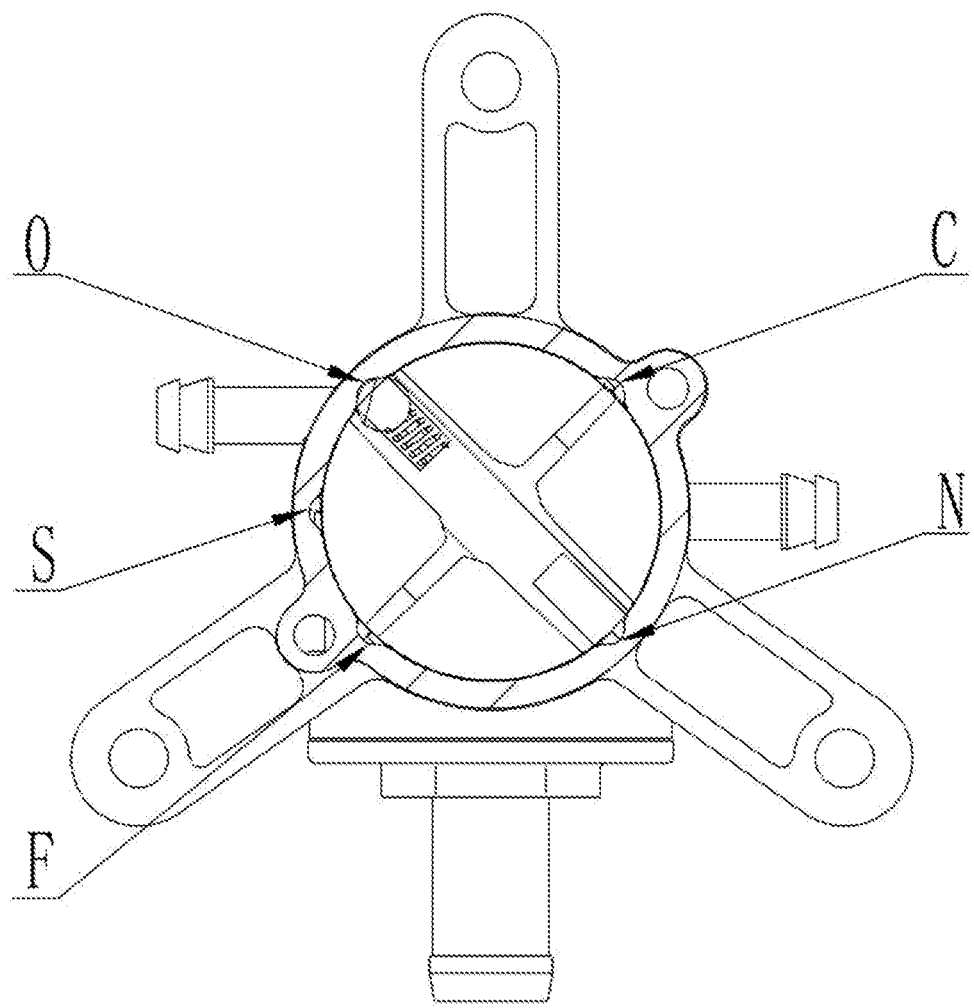
FIG. 7 is a schematic view when an alignment part on a housing in FIG. 1 is set to multiple positions.

The embodiment is basically as shown in FIG. 1 to FIG. 7. A multi-fuel switching device includes a gas part. The gas part includes a switching valve. The switching valve includes a housing 1 having an air inlet 11 and an air outlet 12. In the embodiment, the center line of the air inlet 11 and the center line of the air outlet 12 are perpendicular to each other. A valve core 4 is rotatably set within the housing and located between the air inlet 11 and the air outlet 12. The valve core 4 is provided with a first airway 41 and a second airway 42. The first airway 41 and the second airway 42 are both disposed along a direction of a rotating shaft 5 perpendicular to the valve core 4. Cross-sectional sizes of the first airway 41 and the second airway 42 are different. The first airway 41 or the second airway 42 is selected through rotating the valve core 4 to connect the air inlet 11 and the air outlet 12. The valve core 4 is provided with an inlet 43 opposite to the air inlet 11. The inlet 43 extends along the direction of the rotating shaft 5 of the valve core 4, so that the valve core 4 always keeps the inlet 43 connected to the air inlet 11 when spinning. The first airway 41 and the second airway 42 are both connected to the inlet 43, so that the first airway 41 and the second airway 42 are distributed in a V-shape. On the valve core 4, a contour of a region of the valve core 4 located between an end of the first airway 41 away from the inlet 43 and an end of the second airway 42 away from the inlet 43 is greater than a contour of the air outlet 12, so that the region of the valve core 4 can cover and seal the air outlet 12 to cut off gas fuel.

The housing 1 is rotatably connected to the rotating shaft 5. The rotating shaft 5 is statically connected with the valve core 4. In the embodiment, the valve core 4 is provided with an elongated groove. An end part of the rotating shaft 5 is provided with a block cooperating with the elongated groove. Synchronous rotation of the rotating shaft 5 and the valve core 4 is implemented through fitting the block into the groove. The rotating shaft 5 is statically connected with a position feedback device. In the embodiment, the position feedback device includes a spinning part 9 fixedly connected with the rotating shaft 5. The spinning part 9 is provided with an elastic abutting part. The elastic abutting part includes a steel ball 9b slidably cooperating with the spinning part 9 in a radial direction of the rotating shaft 5 and a spring 9a driving the steel ball 9b. The housing 1 is statically connected with an alignment part 10 cooperating with the elastic abutting part. In the embodiment, the alignment part 10 has a groove structure integrally formed with the housing 1. The alignment of a rotating position of the rotating shaft 5 can be implemented through fitting the steel ball 9b of the elastic abutting part into the alignment part 10, so that the valve core 4 stays in a corresponding position.

The housing 1 is connected to a liquid fuel switch. The liquid fuel switch has a feeding nozzle 15 and a discharging nozzle 17. The liquid fuel switch also includes a rotating part 8 linked with the rotating shaft 5. In the embodiment, the rotating part 8 preferably has a disk shape, the rotating part 8 is coaxially and integrally formed with the rotating shaft 5, the rotating part 8 is located between the feeding nozzle 15 and the discharging nozzle 17, and the rotating part 8 is provided with a fuel channel 16 that implements connection between the feeding nozzle 15 and the discharging nozzle 17 through rotating the rotating part 8. In order to improve structural integrity and assembly convenience, the liquid fuel switch and the switching valve share the housing 1, and the liquid fuel switch is disposed between the position feedback device and the valve core 4.

The carburetor is provided with a solenoid valve. The housing 1 is installed with a solenoid valve switch 3 on a side of the rotating shaft 5 for controlling the solenoid valve to connect or disconnect the carburetor main jet. The rotating shaft 5 is provided with a protruding part 51 in contact with the solenoid valve switch 3. The housing 1 is also installed with a flameout switch 2 on the side of the rotating shaft 5. The rotating shaft 5 is provided with a flameout boss 52 for triggering the flameout switch 2. The housing 1 is also installed with an ignition angle control switch 53 on the side of the rotating shaft 5. The valve core 4 is linked with a bump cooperating with the ignition angle control switch 53. In the embodiment, for the convenience of connection, the bump is disposed on the rotating shaft 5, thereby implementing linkage between the bump and the valve core 4. The bump is spinned by a certain angle through rotating the rotating shaft 5, so that a corresponding ignition signal can be implemented in a case where different fuels are used, thereby advancing or delaying ignition corresponding to different fuels. In order to ensure the accurate rotation of the valve core 4 to the corresponding position, the alignment part 10 of the position feedback device is set into multiple groove structures, which respectively correspond to a liquid fuel position F, a first gas fuel position C, a second gas fuel position N, a fuel-off flame-on position S, and a shut-down flameout position O.

The specific use process is as follows. When an internal combustion engine uses a liquid fuel mode, the protruding part 51 contacts the solenoid valve switch 3, so that the solenoid valve connect the fuel supply between the carburetor fuel bowl and main jet. At the same time, the fuel channel 16 on the rotating part 8 connects the feeding nozzle 15 and the discharging nozzle 17, and the first airway 41 and the second airway 42 on the valve core 4 are both not connected to the air inlet 11 and the air outlet 12, so that fuel in the carburetor may enter the internal combustion engine for combustion. When the internal combustion engine is switched from the liquid fuel mode to a gas fuel mode, the rotating shaft 5 is rotated to separate the protruding part 51 from the solenoid valve switch 3, so that the solenoid valve cut off the fuel supply from the carburetor fuel bowl to main jet. At the same time, the rotating part 8 is rotated along with the rotating shaft 5 to disconnect the feeding nozzle 15 and the discharging nozzle 17, so that the first airway 41 or the second airway 42 on the valve core 4 connects the air inlet 11 and the air outlet 12 (the specific airway for connection is selected according to the type of the gas fuel). At this time, the ignition angle control switch 53 disposed on the side of the rotating shaft 5 is triggered by the bump. The ignition angle control switch 53 identifies the fuel used by the internal combustion engine through a rotation angle of the rotating shaft, and then selects a corresponding ignition angle based on the used fuel.

The above is only the embodiment of the disclosure, and common knowledge such as conventional specific structures and characteristics in the solution are not overly described here. It should be pointed out that for persons skilled in the art, on the premise of not departing from the structure of the disclosure, several modifications and improvements may also be made, which should also be regarded as being within the protection scope of the disclosure and will not affect the effect of the implementation of the disclosure and the utility of the patent.

What is claimed is:

1. A multi-fuel switching device, comprising a gas part, wherein the gas part comprises a switching valve, the switching valve comprises a housing having an air inlet and an air outlet, a valve core is rotatably set within the housing and located between the air inlet and the air outlet, the valve core is provided with a first airway and a second airway, cross-sectional sizes of the first airway and the second airway are different, and the first airway or the second airway is selected through rotating the valve core to connect the air inlet and the air outlet.

2. The multi-fuel switching device according to claim 1, wherein the valve core is provided with an inlet opposite to the air inlet, the inlet extends along a direction of a rotating shaft of the valve core, and the first airway and the second airway are both connected to the inlet.

3. The multi-fuel switching device according to claim 2, wherein a contour of a region of the valve core between an end of the first airway away from the inlet and an end of the second airway away from the inlet is greater than a contour of the air outlet.

4. The multi-fuel switching device according to claim 1, wherein the housing is rotatably connected to a rotating shaft, the rotating shaft is statically connected to the valve core, and the rotating shaft is statically connected to a position feedback device.

5. The multi-fuel switching device according to claim 4, wherein the position feedback device comprises a spinning part, the spinning part is provided with an elastic abutting part, and the housing is statically connected with an alignment part cooperating with the elastic abutting part.

6. The multi-fuel switching device according to claim 5, wherein the alignment part has a groove shape, and the elastic abutting part comprises a steel ball slidably cooperating with the spinning part and a spring driving the steel ball.

7. The multi-fuel switching device according to claim 1, further comprising a liquid fuel switch, wherein the liquid fuel switch is linked with the valve core.

8. The multi-fuel switching device according to claim 7, wherein the liquid fuel switch has a feeding nozzle and a discharging nozzle, the liquid fuel switch further comprises a rotating part linked with a rotating shaft, the rotating part is located between the feeding nozzle and the discharging nozzle, and the rotating part is provided with a fuel channel that implements connection between the feeding nozzle and the discharging nozzle through rotating the rotating part.

9. The multi-fuel switching device according to claim 8, further comprising a solenoid valve and a solenoid valve switch that control connection and disconnection of a main jet of a carburetor, and a protruding part linked with the rotating shaft and in contact with the solenoid valve switch.

10. The multi-fuel switching device according to claim 9, further comprising a flameout switch located on a side of the rotating shaft and a flameout boss linked with the rotating shaft and used to trigger the flameout switch.

11. The multi-fuel switching device according to claim 1, wherein the housing is connected to an ignition angle control switch, the multi-fuel switching device further comprising a bump linked with the valve core and cooperating with the ignition angle control switch.

* * * * *